Melvin L. Robinson
INVENTOR.

BY Bertram H. Mann

ATTORNEY

United States Patent Office 3,530,547
Patented Sept. 29, 1970

3,530,547
BREAK-AWAY ROPE FASTENER
Melvin L. Robinson, 939 3rd St., Rosenberg, Tex. 77471
Filed Apr. 3, 1968, Ser. No. 718,598
Int. Cl. A44b 11/00, 17/00
U.S. Cl. 24—123                    1 Claim

ABSTRACT OF THE DISCLOSURE

The fastener is constructed of a pair of tubular bodies each having a cup at one end in which a rope end is secured by a screw extending axially through the body and into the rope end. At the other ends of the bodies, respectively, are a socket element and a pin element which telescopingly interfit. The pin element is equipped with rubber O-rings adapted to frictionally grip the socket element to apply predetermined resistance to separation of the body members and attached rope ends.

BACKGROUND OF THE INVENTION

This invention relates to a break-away or quick detachable type of fastener for rope ends. The problem of providing an efficient, yet simple, break-away fastener to be installed in a rope, made up, for instance, into a lariat for use in rodeo type exhibitions, is not solved by devices now available for this purpose.

SUMMARY OF THE INVENTION

Accordingly, an object of the present invention is to provide a break-away type of fastener for insertion in a rope, for instance, one made up into a lariat, and which embodies simplified yet highly effective means for securing the rope ends to the fastener.

Another object is to provide such a fastener with improved, simplified yet highly durable means for resisting the break-away until the fastener device is subjected to at least a predetermined tensional force exerted through the rope.

BRIEF DESCRIPTION OF THE DRAWINGS

These objects and others hereafter appearing are attained by the structure illustrated in the accompanying drawings in which.

DESCRIPTION OF THE PREFERRED EMBODIMENT

Figure 1:
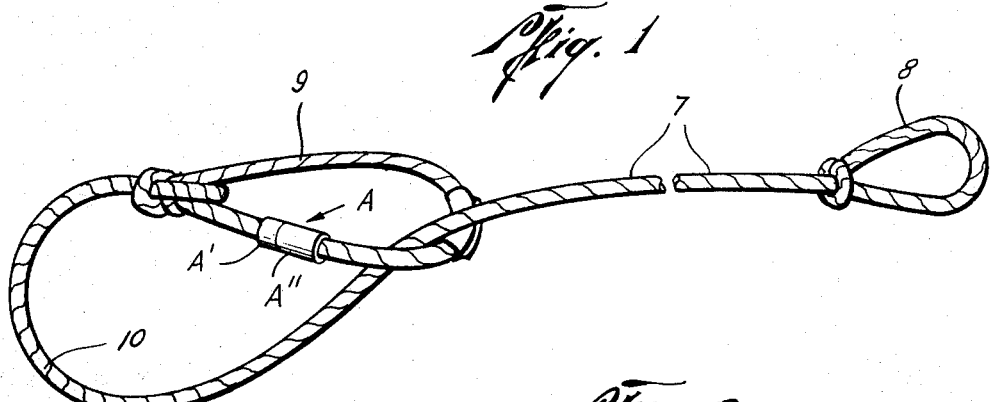
FIG. 1 is a view of a rope made up into a lariat and having the novel break-away fastener applied thereto.
Figure 3:
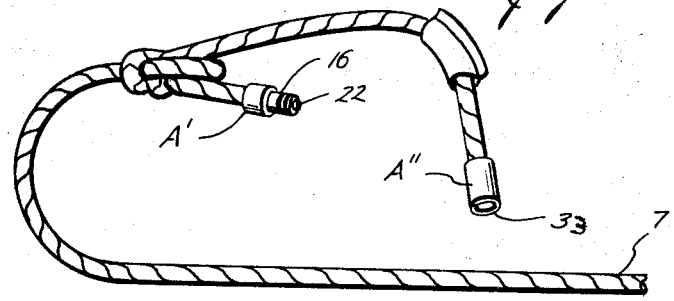
FIG. 3 shows the fastener of FIG. 1 in break-away or separated condition.

FIG. 1 shows a flexible cord 7, which may be a twisted hemp rope, made up into a lariat or lasso. A handhold loop 8 is provided at one end and the loop 9 at the other end receives the rope therethrough to form the animal-circling, running noose 10. The break-away fastener in this case is inserted on the rope at A in loop 9. In this position of the fastener device, the application of predetermined tension through the rope will separate the body parts A′ and A″, as shown in FIG. 3, permitting release of noose part 10 of the main rope so that the lariat can be withdrawn from the animal. Fastener body parts A′ and A″ can be readily reassembled by the rider, as will be explained. This positioning of the fastener is particularly advantageous in connection with practice operations, so that it is not necessary to catch the lassoed animal for recovering a part of the lariat.

Figure 2:
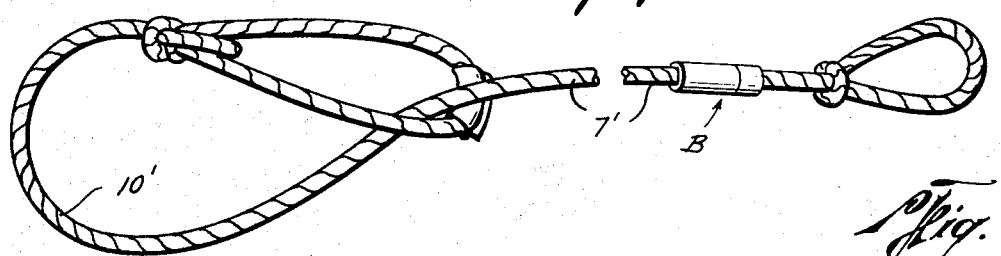
FIG. 2 shows a similarly made up rope, but with the break-away device inserted at a different point.

FIG. 2 shows the fastener device at the position B so that the noose 10′ will remain with the animal when the fastener is broken apart by a sufficient tug on the main rope 7′.

Figure 4:
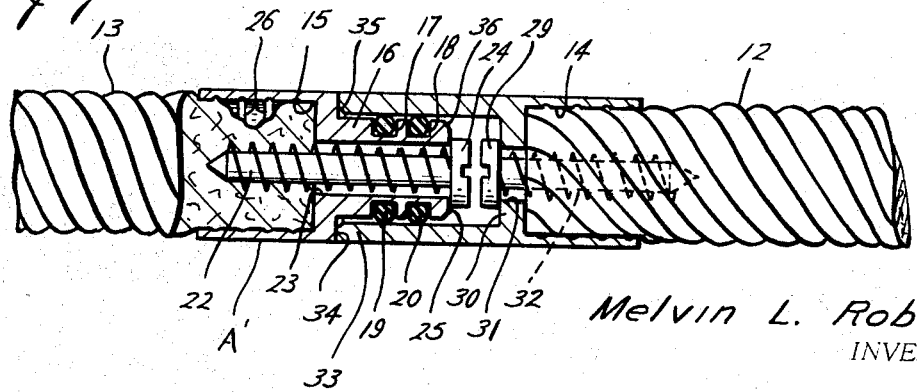
FIG. 4 is an enlarged sectional view showing the break-away fastener applied to rope ends, parts being broken away.

FIG. 4 shows the details of the fastener device. Complementary body members A′ and A″ have rearwardly-facing cups or sockets 14 and 15 receiving rope ends 12 and 13. Body part A″ has a forwardly-extending pin element 16 provided with annular grooves 17 and 18 in which are received rubber O-rings 19 and 20. A screw 22, conveniently a sheet metal screw, extends axially through an orifice 23 in pin element 16 and into rope end 13, thus expanding the rope fibers tightly against the side wall of socket 15. The inner face of the socket side wall is provided with grooves, friction enhancing surfacing, as 26, or knurling or roughening for improving the gripping of the rope end, and the attachment may be further improved by the addition of glue, although this has been found unnecessary in most cases. Screw 22 has a head 24 which seats against the end 25 of pin element 16.

The other body member A′ has a transverse wall 30 provided with a coaxial orifice 31 through which a screw 32 passes, the screw extending longitudinally into rope end 12 and pressing the rope fibers securely against the side wall of socket 14, as previously described. Head 29 of the screw rests against transverse wall 30. Extending forwardly from transverse wall 30 is a cup or socket element 33 with its I.D. designed to snugly receive O-rings 19 and 20. The side wall of socket element 31 is of such length as to engage shoulder 34 at the base of pin element 16 before screw heads 24 and 29 come together in the assembly. Preferably, chambers 35 and 36 will be provided at the forward corners, respectively, of socket elment 33 and pin element 16 to facilitate interfitting of these elements.

In an exemplary embodiment of the fastener, body members A′ and A″ were machined from ½″ aluminum bar stock and sockets 14 and 15 were of .453″ internal diameter and .044″ depth. Pin element 16 was of .372″ outer diameter and .040″ length. O-ring grooves 17 and 18 were sized to accommodate standard ⅜″ x ⅛″ rubber O-rings of #70 durometer hardness. Socket element 33 was of .368″ internal diameter and .562″ depth. Screws 22 and 32 were No. 6 tapping flat head screws. All dimensions, of course, were subject to practical working tolerances. These fastener body members were designed for use with ⁷⁄₁₆″ or the like full hemp rope of the type recommended for lariats.

The fastener body members, when secured to rope ends, as shown, may be readily telescopingly reassembled by the user, after separation as in FIG. 3, and, when so reassembled, will resist longitudinal separation with adequate force to permit normal manipulation of the rope and will separate to release the noose from the encircled object by the application of a predetermined tug on the rope without any twisting or other special manipulation of the fastener itself. Due to the characteristics of O-ring material, it is advisable to store the fastener members in disassembled condition to prevent setting of the O-rings and sticking together of the interfitting pin and socket elements. The configuration of the frictional sealing means 17 and 18 may be varied, and the features as shown may be otherwise modified as will occur to those skilled in the art. The exclusive use of all modifications as come within the scope of the appended claim is contemplated.

I claim:

1. A break-away fastener for rope ends comprising a pair of tubular bodies each having a rearwardly facing cup with a transverse wall having an axial orifice therethrough, said bodies, respectively, having forwardly disposed, telescopingly interfitting pin and socket elements, friction enhancing surfacing in the side wall of each of said cups, a rope end received in each of said cups and abutting its transverse wall, a first screw extending axially from the bottom of said socket element through the orifice of the respective transverse wall and into the respective cup, a second screw extending through an orifice in said pin element and through the orifice of the respective transverse wall and into the respective cup, said screws extending into the respective abutting rope ends and expanding the same into secure attachment with said cups, and at least one resilient seal ring extending about said pin element and frictionally engaging said socket element to resist separation of said body members.

References Cited

UNITED STATES PATENTS

| | | | |
|---|---|---|---|
| 177,122 | 5/1876 | Hayden | 24—123 |
| 513,746 | 1/1894 | Strohbach | 24—123 |
| 723,339 | 3/1903 | Tolman | 24—123 |
| 1,703,579 | 2/1929 | Gaffner | 24—123 |
| 1,774,347 | 8/1930 | Bainton. | |
| 2,704,681 | 3/1955 | Fischer | 287—126 X |
| 2,917,722 | 12/1959 | Cobbett | 339—259 X |
| 2,530,031 | 11/1950 | Rudolph. | |

FOREIGN PATENTS 17,484   2/1903   Sweden.

BERNARD A. GELAK, Primary Examiner

U.S. Cl. X.R.

24—201; 119—106; 287—126